(12) United States Patent
Livesay

(10) Patent No.: US 9,093,186 B2
(45) Date of Patent: Jul. 28, 2015

(54) ADAPTORS FOR RADIATION DETECTORS

(71) Applicant: UT-Battelle, LLC, Oak Ridge, TN (US)

(72) Inventor: Ronald Jason Livesay, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 14/135,954

(22) Filed: Dec. 20, 2013

(65) Prior Publication Data

US 2014/0246587 A1    Sep. 4, 2014

Related U.S. Application Data

(63) Continuation of application No. 13/623,749, filed on Sep. 20, 2012.

(60) Provisional application No. 61/537,634, filed on Sep. 22, 2011.

(51) Int. Cl.
| | | |
|---|---|---|
| *G01T 1/164* | (2006.01) | |
| *G21K 1/02* | (2006.01) | |
| *G01T 1/167* | (2006.01) | |
| *G01T 7/00* | (2006.01) | |
| *G01T 1/16* | (2006.01) | |

(52) U.S. Cl.
CPC ... *G21K 1/02* (2013.01); *G01T 1/16* (2013.01); *G01T 1/167* (2013.01); *G01T 7/00* (2013.01)

(58) Field of Classification Search
CPC ........ G01T 1/249; G01T 7/00; G01N 23/046; G21K 1/02
USPC .......................................... 250/363.01–363.1
See application file for complete search history.

(56) References Cited

U.S. PATENT DOCUMENTS

| | | | | |
|---|---|---|---|---|
| 3,028,493 A | | 4/1962 | Takahashi | |
| 4,500,781 A | * | 2/1985 | Culver et al. | ............... 250/269.5 |
| 5,003,980 A | * | 4/1991 | Loo et al. | ...................... 600/407 |
| 5,090,040 A | * | 2/1992 | Lanza et al. | .................... 378/62 |

(Continued)

FOREIGN PATENT DOCUMENTS

| | | |
|---|---|---|
| CN | 2149626 Y | 12/1993 |
| EP | 0425 333 A1 | 5/1991 |

(Continued)

OTHER PUBLICATIONS

International Search Report dated Apr. 3, 2013, issued by the International Searching Authority in corresponding PCT Application No. PCT/US2012/056378, filed Sep. 20, 2012.

(Continued)

*Primary Examiner* — Kiho Kim
(74) *Attorney, Agent, or Firm* — Klarquist Sparkman, LLP

(57) ABSTRACT

Described herein are adaptors and other devices for radiation detectors that can be used to make accurate spectral measurements of both small and large bulk sources of radioactivity, such as building structures, soils, vessels, large equipment, and liquid bodies. Some exemplary devices comprise an adaptor for a radiation detector, wherein the adaptor can be configured to collimate radiation passing through the adapter from an external radiation source to the radiation detector and the adaptor can be configured to enclose a radiation source within the adapter to allow the radiation detector to measure radiation emitted from the enclosed radiation source.

15 Claims, 8 Drawing Sheets

(56) References Cited

U.S. PATENT DOCUMENTS

| | | | |
|---|---|---|---|
| 5,210,422 A | 5/1993 | Kurakake et al. | |
| 6,414,754 B1 * | 7/2002 | Johnson | 356/338 |
| 6,771,802 B1 * | 8/2004 | Patt et al. | 382/128 |
| 2003/0195046 A1 * | 10/2003 | Bartsch | 463/49 |
| 2006/0049351 A1 * | 3/2006 | Bushberg et al. | 250/336.1 |
| 2009/0140150 A1 * | 6/2009 | Ivan et al. | 250/361 R |
| 2010/0272240 A1 | 10/2010 | Cochrane | |

FOREIGN PATENT DOCUMENTS

| | | |
|---|---|---|
| GB | 2126337 A | 3/1984 |
| JP | 1-260389 A | 10/1989 |
| JP | 2-263185 A | 10/1990 |
| JP | 2000-065935 A | 3/2000 |
| WO | WO 90/15346 | 12/1990 |
| WO | WO 2010/058202 A1 | 5/2010 |
| WO | WO 2013/043898 A2 | 3/2013 |

OTHER PUBLICATIONS

Written Opinion dated Apr. 3, 2013, issued by the International Searching Authority in corresponding PCT Application No. PCT/US2012/056378, filed Sep. 20, 2012.

\* cited by examiner

ADAPTORS FOR RADIATION DETECTORS

CROSS REFERENCE TO RELATED APPLICATIONS

This application is a continuation of U.S. patent application Ser. No. 13/623,749, filed on Sep. 20, 2012, which claims the benefit of U.S. Provisional Application No. 61/537,634, filed on Sep. 22, 2011, both of which are incorporated herein by reference in their entirety.

ACKNOWLEDGMENT OF GOVERNMENT SUPPORT

This invention was made with government support under Contract No. DE-AC05-00OR22725 awarded by the U.S. Department of Energy. The government has certain rights in the invention.

FIELD

This disclosure is related to radiation detection.

BACKGROUND

Particle detectors, also known as radiation detectors, are devices used to detect, track, and/or identify high-energy radiation, such as high-energy particles or waves. Some embodiments of radiation detectors are configured to detect and identify specific radioisotopes emitted from a target to inspect the target for the presence of certain materials that produce such radioisotopes. Some radiation detectors can be large, stationary devices, while other radiation detectors can be smaller, portable devices for use in the field. For example, the ORTEC® Detective™ family of radioisotope identifiers, manufactured by Advanced Measurement Technology of Oak Ridge, Tenn., are examples of portable radiation detectors. Portable radiation detectors are typically carried by hand and pointed at targets to inspect for radiation.

Portable radiation detectors can be used in the field to perform tasks such as inspecting cargo containers or other targets for radioactive materials. However, any objects that are identified as being radioactive or containing radioactive material typically have to be further tested with other devices to determine exactly what radioactive material is present and in what quantity. Typically, this means sending the radioactive material, or a sample of it, to a laboratory for further testing using more specialized equipment. Thus, there is a need in the art for a way to perform more precise testing of radioactive targets in the field using portable equipment.

SUMMARY

Described herein are adaptors and other devices for radiation detectors that can be used to improve the identification and/or quantification of both small and large bulk sources of radioactivity, such as building structures, soils, vessels, large equipment, and liquid bodies, for example.

Some exemplary devices comprise an adaptor for a radiation detector, wherein the adaptor can be configured to collimate radiation passing through the adapter from an external radiation source to the radiation detector and the adaptor can be configured to enclose a radiation source within the adapter to allow the radiation detector to measure radiation emitted from the enclosed radiation source.

In some embodiments, the adaptor comprises a barrel collimator having a tubular body with an open first end couplable to the radiation detector and an open second end opposite the first end. The adaptor can further comprise an end cap couplable to the open second end of the barrel collimator to enclose a radiation source within the adapter to allow the radiation detector to measure radiation emitted from the enclosed radiation source. The barrel collimator and the end cap can be configured to block background radiation from outside the adapter from reaching the radiation detector, such that a relatively weak radiation source within the enclosure can be measured more precisely over a long dwell time. The barrel collimator can comprise a plurality of set screws or other fasteners that extend through the tubular body and/or a pedestal that is positionable within the barrel collimator and configured to hold a radiation source within the enclosed adapter.

In some embodiments, the adapter comprises a pinhole collimator coupled to the barrel collimator. The pinhole collimator comprises a pinhole aperture for collimating radiation entering the barrel collimator from an external radiation source. The adaptor can further comprise means for closing the pin-hole aperture, such as an insertable screw, to block radiation from passing through the pin-hole aperture.

In some embodiments, the device can comprise a radiation detector coupled to the adaptor. The radiation detector can comprise a portable radiation detector, such as a portable radioisotope identifier.

Exemplary embodiments of an adaptor kit for a portable radioisotope identifier kit can comprise an annular barrel collimator configured to be coupled to a collimator of the portable radioisotope identifier and a pin-hole collimator comprising a pin-hole collimation aperture and configured to be coupled to an open end of the barrel collimator. The kit can further comprise a pedestal configured to be positioned within the barrel collimator and configured to hold a radiation source within the barrel collimator and/or the kit can further comprise a plurality of fasteners configured to hold a radiation source within the barrel collimator, such as set screws. The barrel collimator and the pin-hole collimator can be comprised of tungsten in some embodiments, which can provide enhanced background radiation suppression compared to steel embodiments. The collimation aperture of the pin-hole collimator can be closable to further block external background radiation from entering the barrel collimator.

Exemplary methods disclosed herein can comprise: using a radiation detector to measure radiation from a plurality of regions of a target, wherein the radiation detector comprises an adaptor, and wherein the measured radiation passes through the adaptor; identifying a region of the target having a radiation value greater than a predetermined threshold value; enclosing a portion of the identified region of the target within the adaptor; and measuring radiation from the enclosed portion of the target with the radiation detector.

In some embodiments the method comprises using a radiation detector to measure radiation from a plurality of regions of a target by positioning the radiation detector on a stand such that the adaptor is pointing toward a first region of the target, measuring radiation from the first region of the target, repositioning the radiation detector on the stand such that the adaptor is pointing toward a second region of the target, and measuring radiation from the second region of the target.

In some embodiments, the enclosing the portion of the identified region of the target within the adaptor comprises positioning the portion of the identified region of the target within a barrel portion of the adaptor and attaching a cap over an open end of the barrel portion, wherein the barrel portion and the cap are comprised of material that blocks external background radiation from reaching the radiation detector.

The foregoing and other objects, features, and advantages of the invention will become more apparent from the following detailed description, which proceeds with reference to the accompanying figures.

DETAILED DESCRIPTION

Described herein are adaptors and other devices that can be used with a radiation detector to provide additional functionality, and methods related thereto. As used herein, the term radiation detector means a device configured to detect and identify radiation and/or high-energy particles.

Some embodiments of the adaptors for radiation detectors can be configured to collimate radiation passing through the adaptor from an external radiation source to the radiation detector. The term collimate, and related terms such as collimator, mean to narrow a beam of particles or waves, such as to cause the directions of motion to become more aligned in a specific direction or to cause the spatial cross section of a beam to become smaller. To collimate radiation, an adaptor can comprise an annular shaped body having an opening extending therethrough for radiation to pass through. In some embodiments, radiation approaching the adaptor head-on can pass through the opening without being affected by the annular body, while radiation approaching from an angle is blocked by the annular wall and does not reach the radiation detector.

Thus, when attached to a radiation detector, a collimation adaptor, or collimator, can limit the amount of radiation that reaches the detector by narrowing the angle of view of the detector. by reducing the viewing angle of the radiation detector, the adaptor can allow for more precise radiation detection over smaller and/or more clearly define target areas.

Some embodiments of adaptors for radiation detectors can be configured to enclose a radiation source within the adaptor to allow the radiation detector to measure radiation emitted from the enclosed radiation source. This can be particularly useful for low-intensity radiation that is measured over a longer period of time. In such embodiments, the adaptor can be configured to fully enclose the radiation source and to block a significant portion of background radiation from entering the adaptor and reaching the radiation detector while the measurement is taking place. Additional components can be included, such as set screws and/or a pedestal within the adaptor, to facilitate holding a radiation sample in a fixed positioned within the adaptor.

Some embodiments of adaptors for radiation detectors can have at least one configuration for use in collimating radiation passing through the adaptor and at least one configuration for use in enclosing a radiation source within the adaptor.

Figure 1:
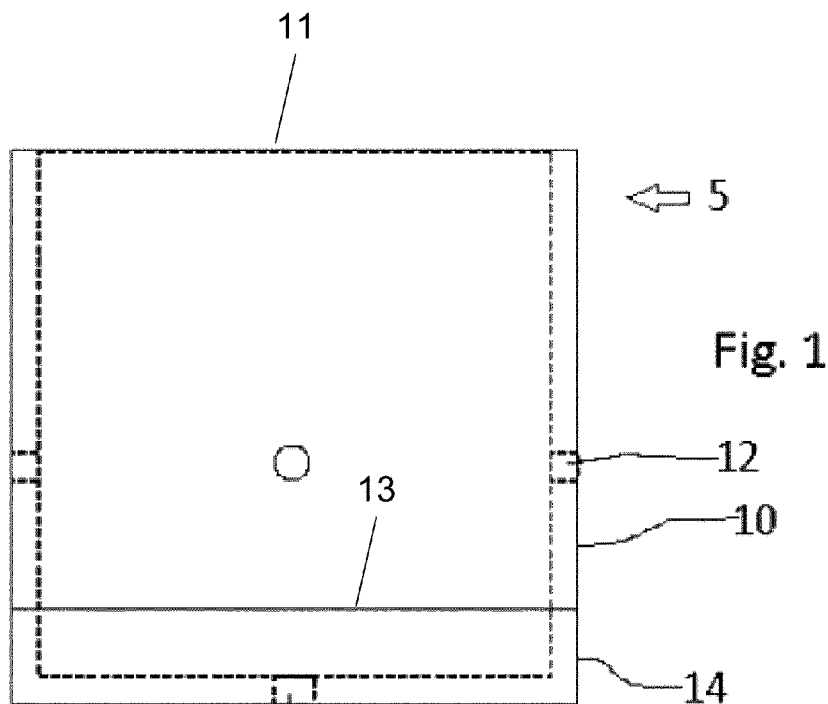
FIG. 1 is a side-view of an exemplary adaptor for a radiation detector.
Figure 2:
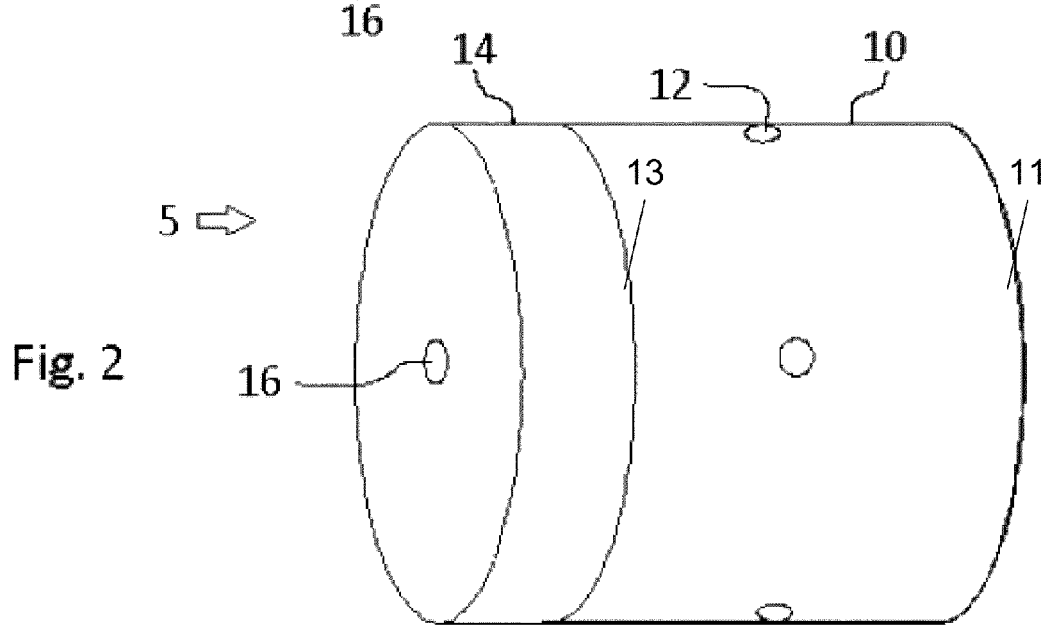
FIG. 2 is an isometric view of the adaptor of FIG. 1.
Figure 7:
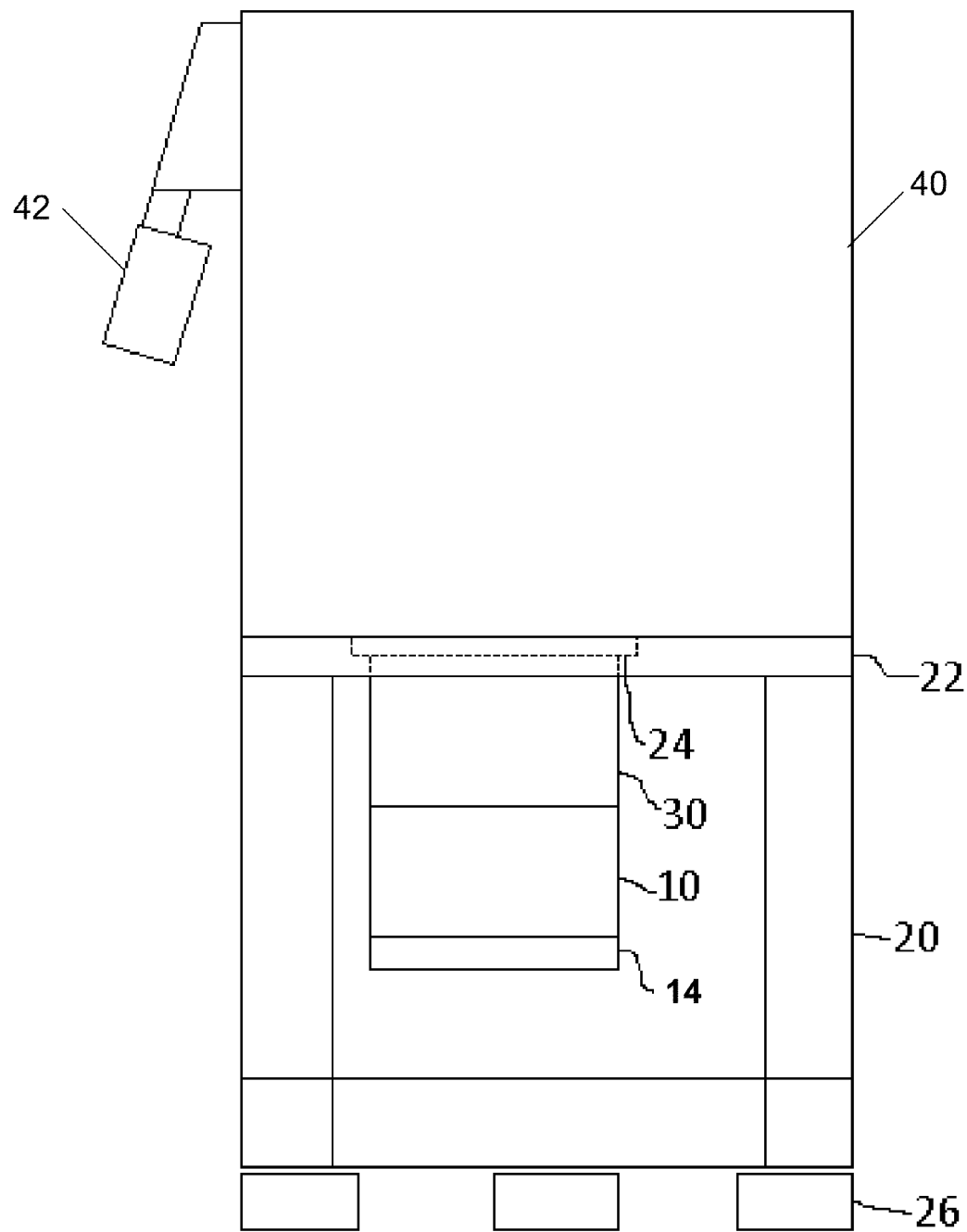
FIG. 7 is a side view of an exemplary assembly comprising a radiation detector mounted on the stand of FIG. 5 with the adaptor of FIG. 1 attached.
Figure 11:
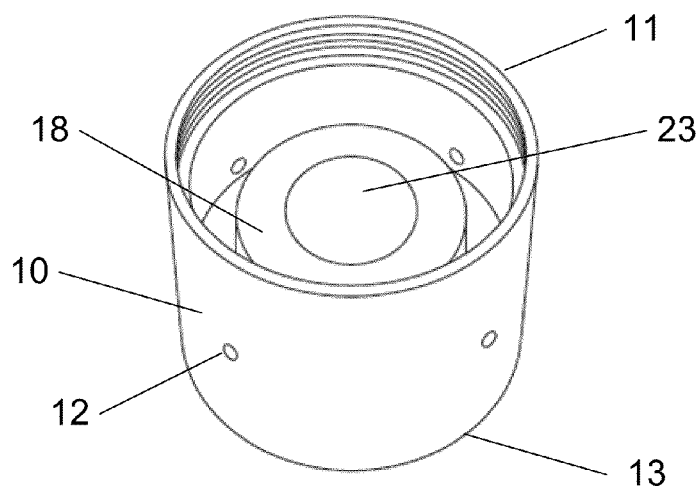
FIG. 11 is a perspective view of the adaptor of FIG. 1 with the button source pedestal of FIG. 3 positioned within the adaptor.

An exemplary multipurpose adaptor 5 for a radiation detector is shown in FIGS. 1 and 2. The adaptor 5 comprises a barrel collimator 10 and a pinhole collimator 14. The barrel collimator 10 comprises an annular body defining a cylindrical central opening passing through the body. The barrel collimator 10 can have a first end 11 and an opposite second end 13. The first end 11 of the barrel collimator 10 can be couplable to a radiation detector (as shown in FIGS. 7 and 11) such that radiation reaching the detector passes through the central opening of the barrel collimator from the second end 13. The first end of the barrel collimator can comprise a threaded portion that is configured to screw onto a mating threaded portion of the radiation detector. In some embodiments, the first end 11 of the barrel collimator 10 can be couplable in series with another one or more intermediate components that are attached to the radiation detector, such as another collimator (e.g., the collimator 30 shown in FIG. 7). In addition, the second end 13 of the barrel collimator 10 can be couplable to another adaptor component, such as another collimator or an end cap. Several collimators can be coupled in series to a radiation detector to provide a desired degree of collimation of radiation reaching the detector.

The adaptor 5 can further comprise a pinhole collimator 14 that comprises a cylindrical shaped body having a pinhole opening 16. The pinhole collimator 14 can have about the same outer diameter as the barrel collimator 10, while the pinhole opening 16 can have a diameter much smaller than the inner diameter of the barrel diameter 10. The pinhole opening 16 can have an axial length that is shorter than its diameter, such as about equal to the sidewall thickness of the barrel collimator 10. The inner surface of the pinhole collimator 14 can be recessed such that the sidewall and bottom wall of the pinhole collimator are about equal to the sidewall thickness of the barrel collimator. Coupling the pinhole collimator 14 to a radiation detector can greatly narrow the field of view of the radiation detector.

Figure 10:
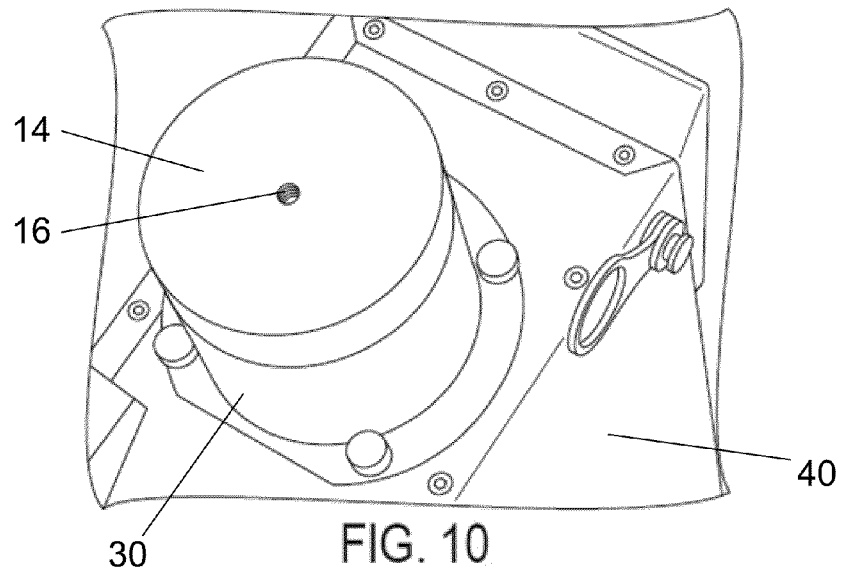
FIG. 10 is perspective view of an exemplary pinhole collimator attached directly to a barrel collimator of a radiation detector.

The pinhole collimator 14 can be coupled to the second end 13 of the barrel collimator 10, as shown in FIGS. 1 and 2, or coupled directly to a radiation detector or another intermediate component without inclusion of the barrel collimator 10, as shown in FIG. 10. In FIG. 10, the pinhole collimator 14 is attached directly to a collimator 30 of a radiation detector 40. A perimeter portion of the pinhole collimator 14 can be threaded to aid in coupling it to the barrel collimator 10, the collimator 30, or other components.

The disclosed adaptor 5 can be used with a variety of different radiation detectors, which can each have different geometries. For example, the position of the actual sensor that senses radiation relative to the enclosure of the radiation detector can vary from example to example. In some embodiments, the radiation sensor can be located closer to the distal end of the collimator 30, while in others, the sensor can be located farther inside the enclosure. In embodiments where the sensor is located close to the distal end of the collimator 30, the collimator 30 may only minimally act to collimate radiation reaching the sensor, allowing close to a 180° viewing angle for the sensor. When such a radiation detector, without an adaptor, is pointed at a target, it detects radiation from a panoramic range, which often includes much more radiation that just radiation coming from the intended target. Thus, by coupling the barrel collimator 10 and/or the pinhole collimator 14, the radiation detector can be focused more precisely on the target, thereby eliminating unwanted background radiation and providing truer spectral analysis of the radiation from the target.

Figure 9:
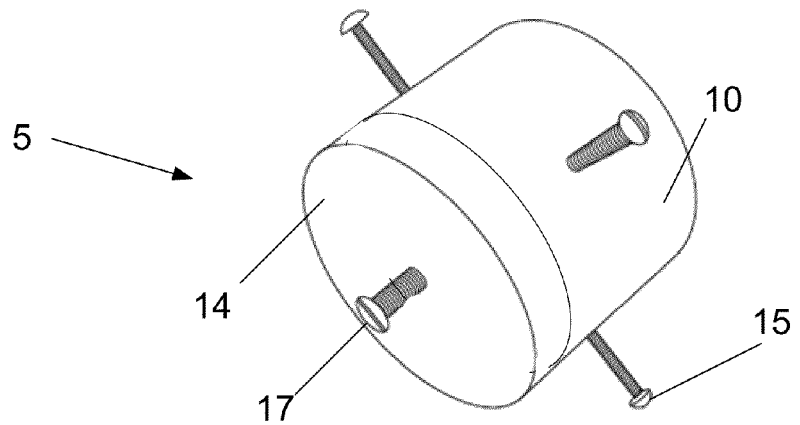
FIG. 9 is a perspective view of the adaptor of FIG. 1 with lateral set screws and a pinhole-closing screw inserted therein.

The pinhole opening 16 can be closeable. In some embodiments, the pinhole opening 16 can be closeable by inserting a screw or other object into the pinhole opening 16 such that it is completely occluded. For example, FIG. 9 shows the adaptor 5 with a screw 17 inserted into the pinhole opening 16. In other embodiments, the pinhole opening 16 can be closeable in other manners.

With the pinhole opening 16 closed, the collimator 14 can function as an end cap that attaches to the second end 13 of the barrel collimator 10 such that the adaptor 5 can be used as an enclosure to enclose a radiation sample for a measurement by a radiation detector. The adaptor 5 can comprise one or more fasteners to hold a radiation source within the adaptor. For example, as shown in FIG. 9, a plurality of set screws 15 can be inserted through holes 12 in the sidewall of the barrel collimator 10 to hold an enclosed radiation sample within the adaptor. In other embodiments, other fasteners can be used to hold a radiation source, such as clips, pins, ties, snaps, straps, receptacles, clamps, trays, etc. In some embodiments, four set screws 15 can be inserted through four respective holes 12 that are arranged at about 90° increments around the circumference of the barrel collimator 10. In other embodiments, a different number of set screws 15 can be used.

Figure 3:
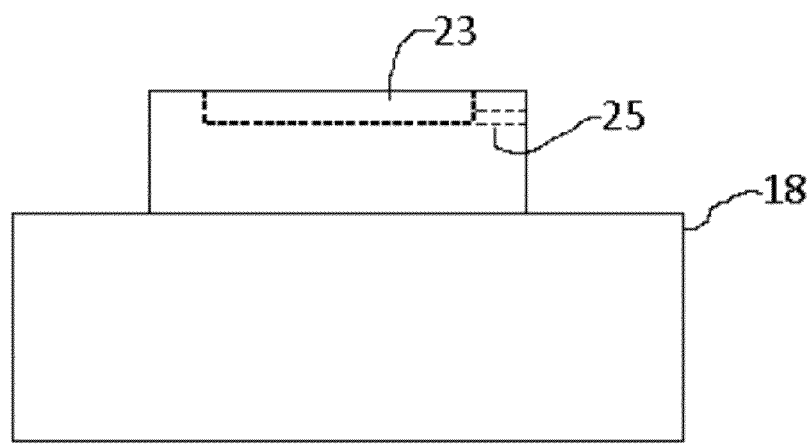
FIG. 3 is a side-view of an exemplary button source pedestal that can be inserted into the adaptor of FIG. 1.
Figure 4:
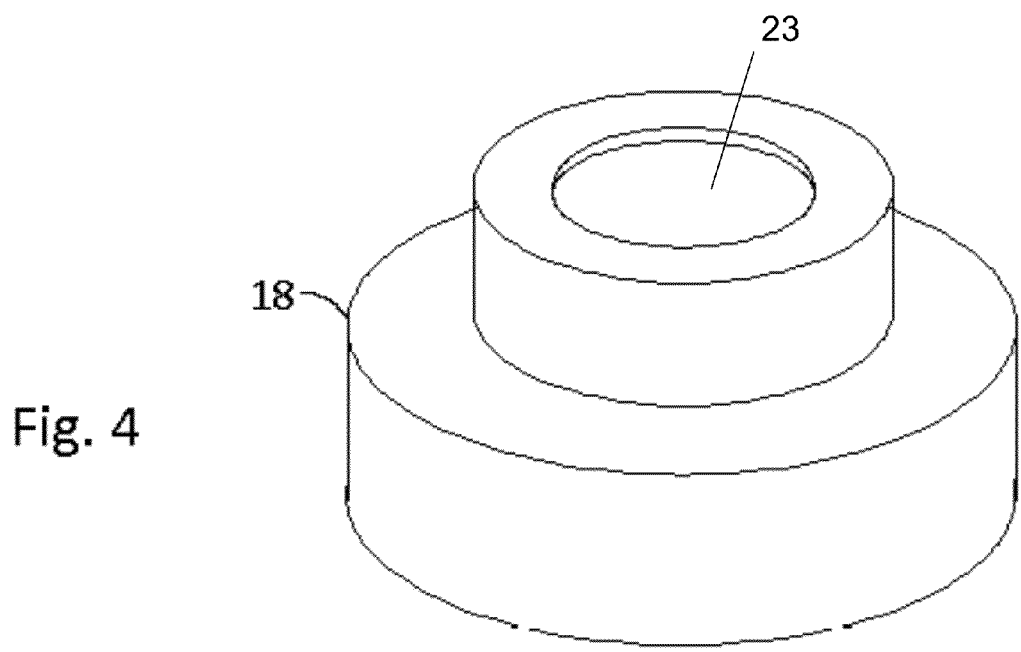
FIG. 4 is an isometric view of the button source pedestal of FIG. 3.

In some embodiments of the adaptor 5, a pedestal can be inserted into the barrel collimator 10 to hold the radiation sample within the barrel collimator. An exemplary pedestal 18 is shown in FIGS. 3 and 4. The pedestal 18 can comprise a recess 23 configured to hold a radiation sample, such as a button source radiation sample, in a repeatable geometry relative to the barrel collimator 10. The pedestal 18 can be comprised of PVC, for example. Fasteners, such as set screws 15, can be used in some embodiments to secure the pedestal 18 within the barrel collimator 10. The pedestal 18 can comprise a small lateral hole 25, as shown in FIG. 3, to allow insertion of a tool to pry out a button source from the recess 23. FIG. 11 shows an exemplary arrangement of the pedestal 18 positioned within the barrel collimator 10.

In some embodiments, a sample of loose material, such as soil, can be placed into the adaptor 5 to be tested without using a pedestal or fasteners.

Whether using the set screws 15, the pedestal 16, or simply filling the adaptor 5 with loose material, measurements can be made for a plurality of different samples using a repeatable geometry. In other words, the samples can be tested with the same position, the same orientation, and with the same amount of material, such that comparisons of the plural tests can be made with higher precision. Furthermore, all of the tests can be made with the same level of background radiation suppressions due to the consistent geometry of the barrel collimator 10 and pinhole collimator 14.

Figure 8:
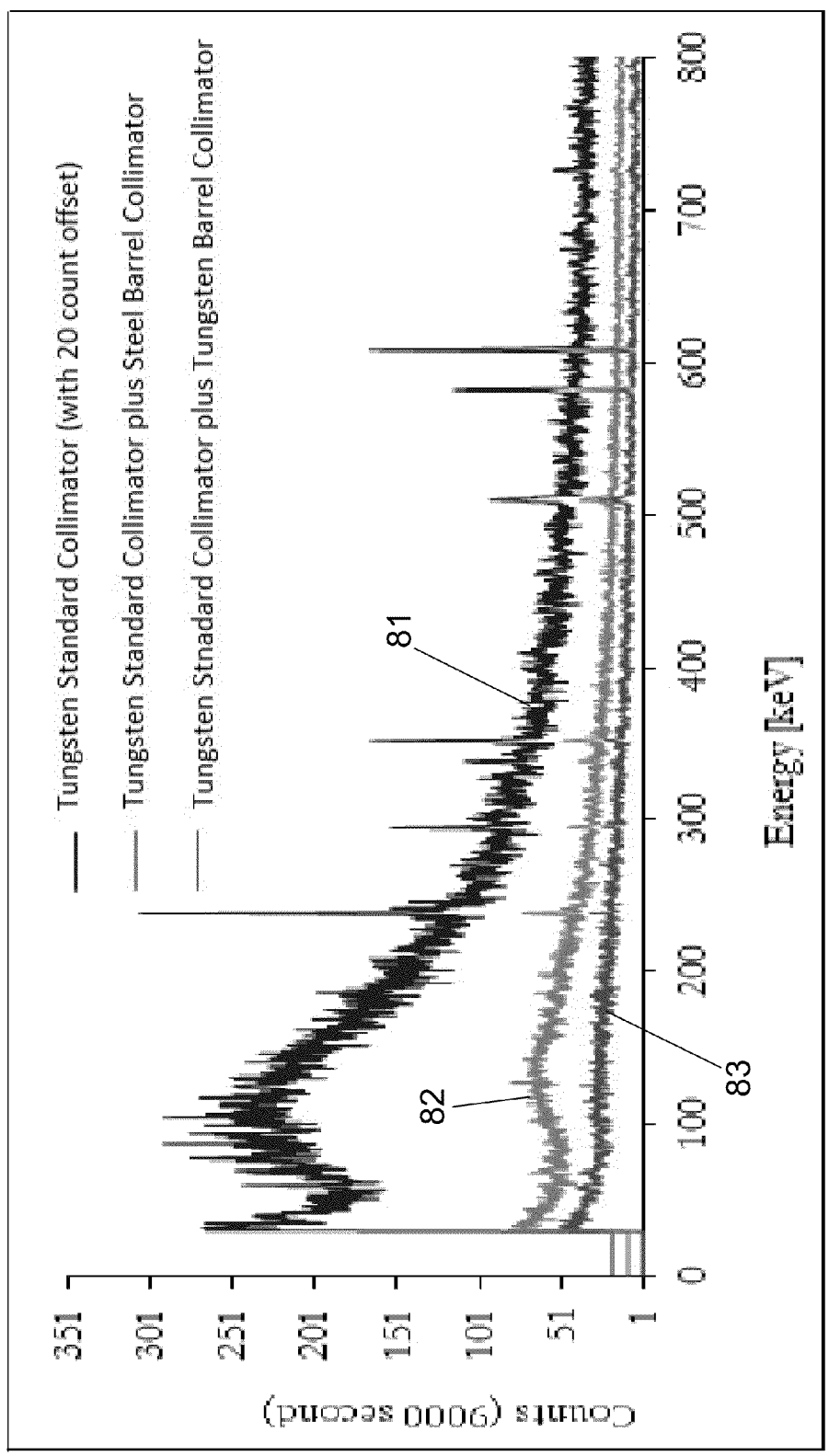
FIG. 8 is a graph illustrating background radiation suppression properties of various embodiments of the adaptor of FIG. 1.

The barrel collimator 10, the pinhole collimator 14, and/or the standard collimator 30 of the radiation detector 40 can be comprised of material, such as steel or tungsten, that blocks radiation from passing through it. FIG. 8 is a graph showing background radiation suppression for three detector/adaptor configurations in terms of radiation counts per second detected as a function of energy. Curve 81 represents the energy of radiation transmitted by a tungsten standard collimator 30 without the barrel collimator 10 or pinhole collimator 14 attached. Curve 82 represents the energy of radiation transmitted by a tungsten standard collimator 30 with a steel barrel collimator 10 attached, but without the pinhole collimator 14. Curve 83 represents the energy of radiation transmitted by a tungsten standard collimator 30 with a tungsten barrel collimator 10 attached, but without a pinhole collimator 14. FIG. 8 illustrates that the addition of a barrel collimator 10 significantly reduces the amount of background radiation that reaches the detector. Furthermore, the tungsten barrel collimator blocks even more background radiation than the steel barrel collimator.

Figure 12:
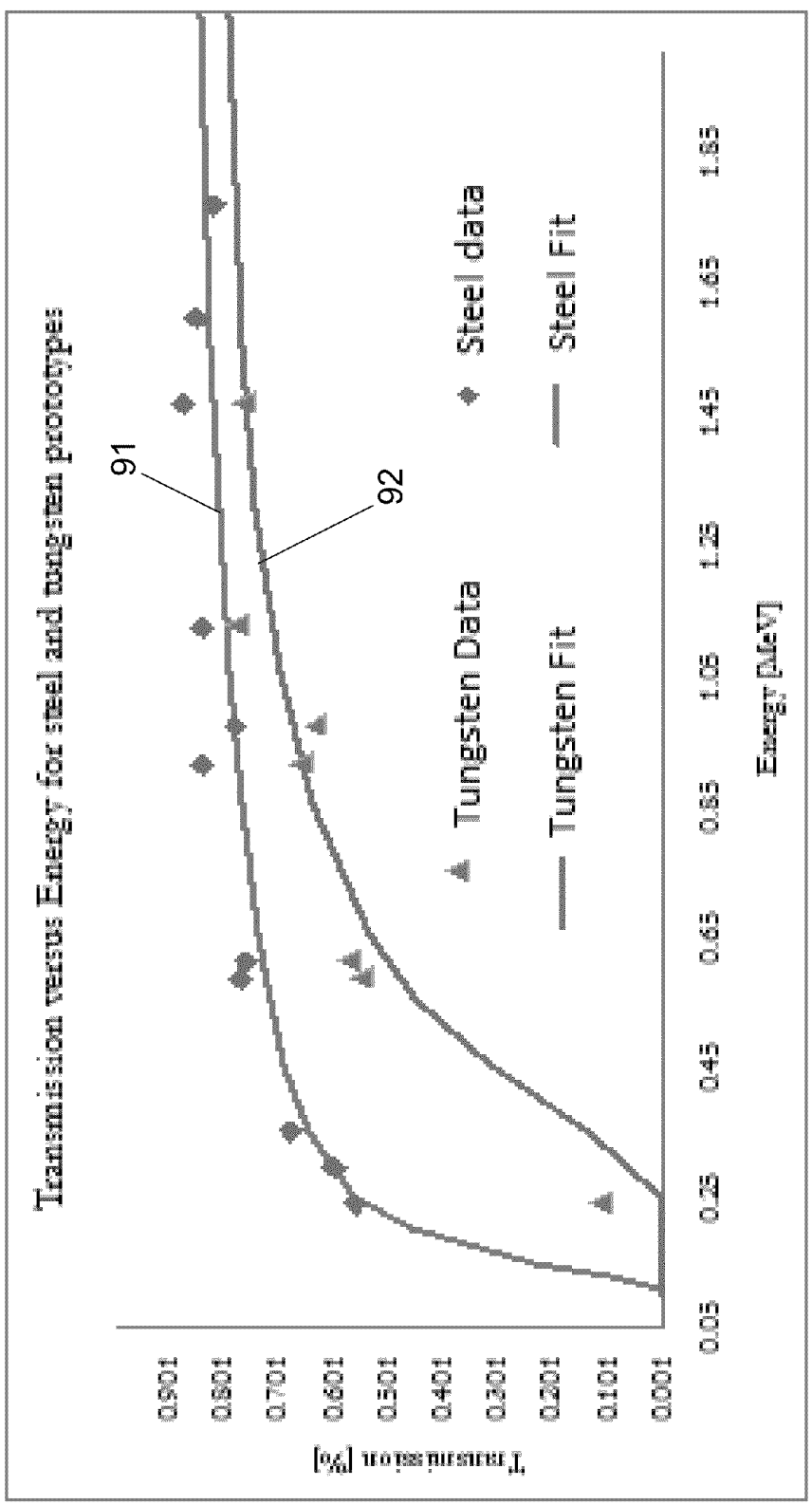
FIG. 12 is a graph showing the transmission of gammas, as a function of energy, through embodiments of radiation detector adaptors made of steel and/or tungsten.

The graph of FIG. 12 also illustrates that tungsten embodiments can block more radiation than steel embodiments. Curve 91 represents the percentage of radiation that is transmitted through a steel embodiment as a function of energy, while curve 92 represents the percentage of radiation that is transmitted through a tungsten embodiment as a function of energy. As illustrated, the tungsten embodiment transmits a lower percentage of radiation across all energy levels. By fabricating the barrel collimator 10 and/or the pinhole collimator 14 of tungsten, significantly higher levels of background radiation suppression can be achieved compared to using steel. Furthermore, increasing the wall thickness can further enhance background suppression.

By blocking a substantial portion of background radiation with the adaptor 5, a radiation detector can be used to measure weaker radiation sources over long periods, or dwell times. This can allow the radiation detector to measure small radiation samples that would not otherwise be measurable with the radiation detector due to the overwhelming background radiation.

Figure 5:
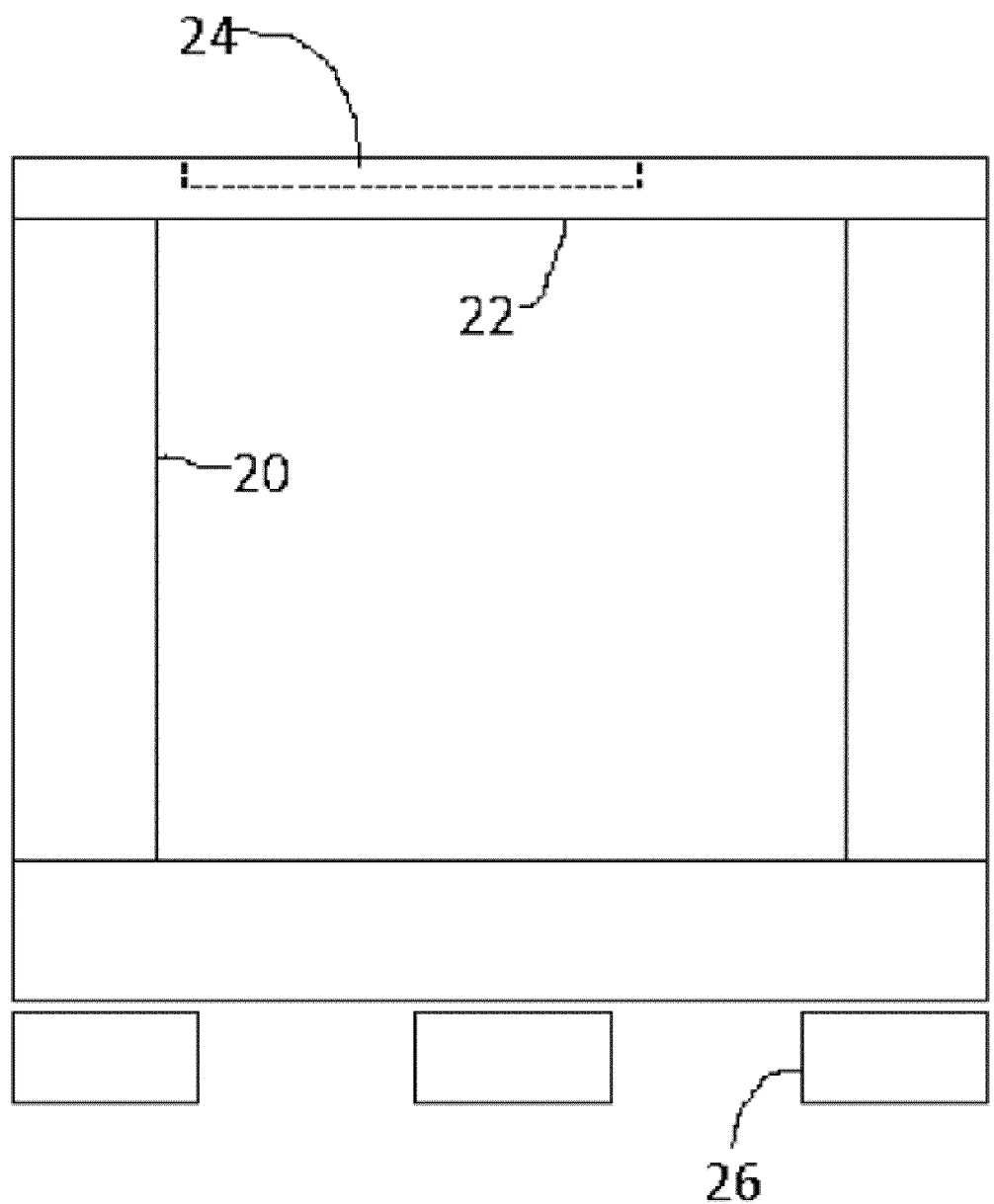
FIG. 5 is a side view of an exemplary stand for supporting a radiation detector.
Figure 6:
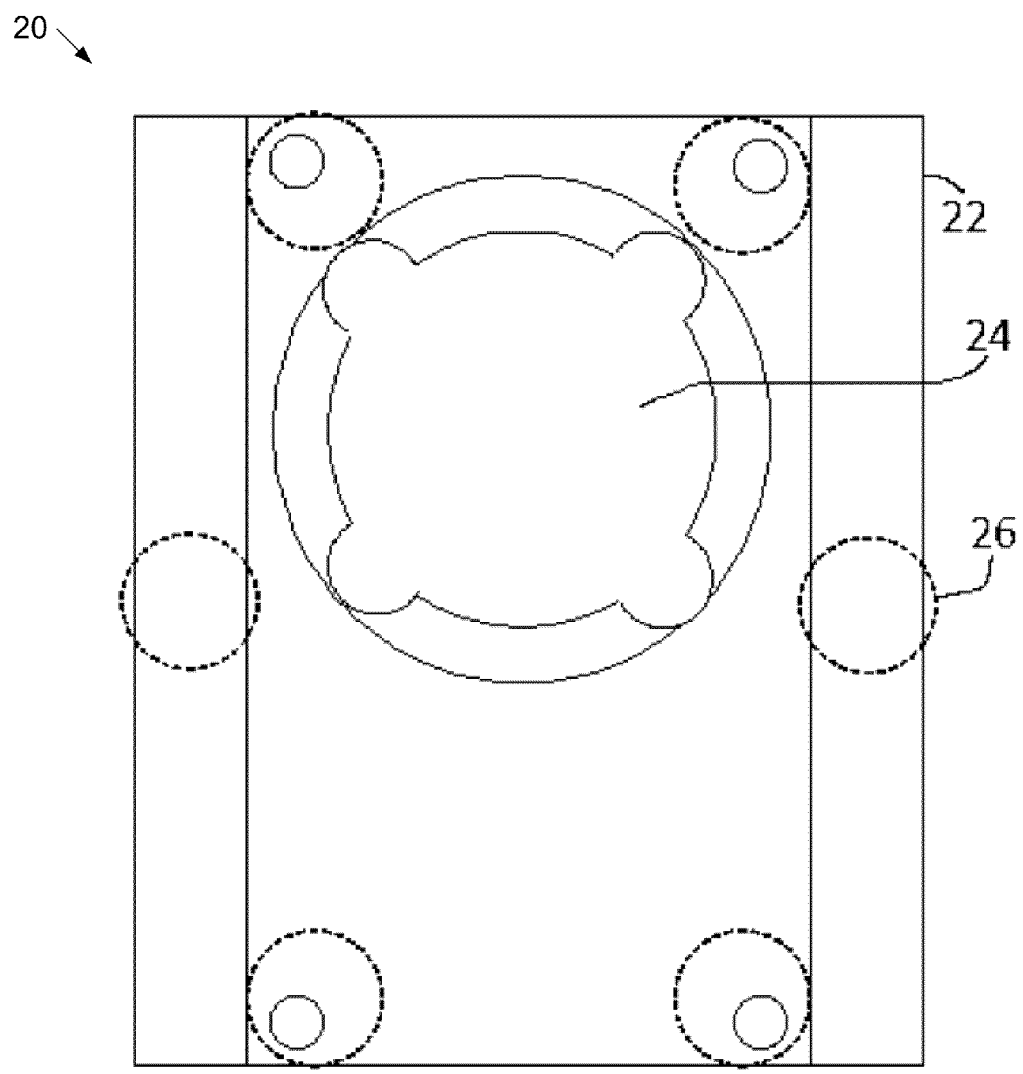
FIG. 6 is a top view of the stand of FIG. 5.

FIGS. 5 and 6 illustrate an exemplary stand 20 that can be used to support a radiation detector with the radiation detector oriented facing downward. The stand 20 can comprise an upper plate 22 configured to engage with a radiation detector, vertical legs or supports, and a plurality of feet 26 to provide a stable, adjustable support structure for the detector. As shown in FIG. 6, the upper plate 22 can comprise an opening 24 configured to receive a standard collimator 30 of the detector pointing downward. As shown in FIG. 7, the collimator 30 can protrude down through the opening 24 with the main body of the radiation detector 40 being supported above the upper plate 22. The adaptor 5 can be attached to the radiation detector 40 either before or after the detector 40 is mounted on the stand. The radiation detector 40 shown in FIG. 7 can comprise a portable type of radiation detector, such as a member of the ORTEC® Detective™ family of hand-held radioisotope identifiers. The illustrated radiation detector 40 comprises a handle 42 for carrying the radiation detector during conventional use when not mounted in the stand 20. When the radiation detector 40 is mounted in the stand 20, it becomes a stationary instrument that can be pointed in a stable, consistent direction, such as straight down, without the inconsistency of being carrying by a person via the handle 42. In some embodiments, the stand 20 can comprise features, such as fasteners, straps, locks, etc., for securing the detector 40 to the stand.

In some embodiments, the stand can be comprised of lightweight, sturdy material, such as aluminum, and can be configured to be easily broken down or collapsed for ease of transportation and set up in the field.

In some examples, the system shown in FIG. 7 can have an overall height of about two feet, with the stand 20 being about 12 inches (30.5 cm) tall and about 10 inches (25.4 cm) long, and about 8 inches (20.3 cm) wide. The opening 24 in the upper plate 22 can have a diameter of about 3.5 inches (8.9 cm). The adaptor 5 can be about 3.375 inches (8.6 cm) in outer diameter (excluding the set screws) and about 2.75 inches (7.0 cm) in length. The barrel collimator 10 can have a length of about 2 inches (5.1 cm) and the pinhole collimator 14 can have a length of about 0.75 inches (1.9 cm). The wall thickness of the barrel collimator 10 can be about 5 mm. The holes 12 for the set screws can be located about 1.375 inches (3.5 cm) from the distal end of the pinhole collimator 14. The pinhole opening 16 can range in size, depending on the desired level of collimation, such as about 7 mm in diameter. The pedestal 18 can have an outer diameter about equal to the inner diameter of the barrel collimator 10 to provide a snug fit. The overall height of the pedestal 18 can be about 1.625 inches (4.1 cm), with the recess 23 having a depth of about 0.25 inches (0.6 cm) and a diameter of about 1.25 inches (3.2 cm).

With the radiation detector 40 mounted on the stand 20, it can be used to survey the radioactivity of an underlying surface, such a building floor, pavement, concrete, sand, water, or soil. As shown in FIG. 7, the adaptor 5 can be mounted on the detector 40 (with or without the pinhole collimator 14) while the detector is mounted on the stand 20 to limit the portion of the underlying surface that is within the field of view of the detector. A large underlying area can be surveyed by moving the stand 20 and detector 40 to a plurality of locations across the surface, such as in a grid-like pattern, and taking measurements at each position. The level and/or type of radiation detected at each position across the surface can then be mapped to identify regions of the surface that are high in radioactivity or are otherwise distinct from other regions of the surface.

The adaptor 5 can be converted from a collimator to an enclosure, as discussed above, to more thoroughly and carefully test samples of radioactive material, such as to determine distribution of radiation contamination over a target area. For example, when a portion of a target is found to be radioactive, a sample of the target from that portion can be placed inside of the adaptor 5 to test the sample in isolation with background radiation being suppressed. This can allow the radiation detector to take a more precise, accurate measurement of the radioactivity of the sample while in the field, rather than having to send the sample back to a laboratory for further testing.

In some exemplary methods, a radiological map can be made of a target object by taking a plurality of small samples from different portions of the target object and enclosing each sample within the adaptor 5 for testing of each sample with the radiation detector. The samples can be taken from the target object in a grid-like pattern or other pattern and the results of the sample testing can then be mapped to the same pattern to create a radiological map of the target object.

In some exemplary methods, a movable target object can be surveyed using a radiation detector mounted on the stand 20 with the pinhole collimator 14 coupled to the detector and the pinhole opening 16 being open. The target object can be incrementally moved past the stationary pinhole opening 16 and a plurality of portions of the target object can be individually measured with the detector. For example, a length of rebar can be incrementally passed under the pinhole opening 16 (such as through the legs of the stand 20) and a plurality of radiation measurements can be taken along the length of the rebar. Each of the plural measurements can then be mapped to characterize the radioactivity of the rebar as a function position along its length.

The ability to make such precise, in-field measurements can help to constrain material characteristics for construction projects that are sensitive to radiation levels. This can benefit field projects by reducing the initial costs of testing, by not having to send samples back to a laboratory for testing, and/or by reducing the cost or replacing materials that were not spot-checked in the field prior to installation.

The disclosed adaptors for radiation detectors can also be helpful in determining the extent and/or type of soil and water contamination, such as by creating a radiological map of the soil or body of water using the methods described above.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "provide" to describe the disclosed methods. These terms are high-level abstractions of the actual operations that are performed. The actual operations that correspond to these terms may vary depending on the particular implementation and are readily discernible by one of ordinary skill in the art.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled or associated items absent specific contrary language.

Unless otherwise indicated, all numbers expressing properties, sizes, percentages, measurements, distances, ratios, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

In view of the many possible embodiments to which the disclosed principles may be applied, it should be recognized that the illustrated embodiments are only preferred examples and should not be taken as limiting the scope of the disclosure. Rather, the scope of the disclosure is defined by the following claims. I therefore claim all that comes within the scope and spirit of these claims.

I claim:

1. A device comprising:
a non-transparent adaptor for a radiation detector, the adapter configured to: collimate radiation passing through the adapter from an external radiation source to the radiation detector; and
enclose a radiation source inside of the adapter to allow the radiation detector to measure radiation from the enclosed radiation source.

2. The device of claim 1, wherein the adaptor comprises a barrel collimator having a tubular body with an open first end couplable to the radiation detector and an open second end opposite the first end.

3. The device of claim 2, wherein the adaptor further comprises an end cap couplable to the open second end of the barrel collimator to enclose a radiation source within the adapter to allow the radiation detector to measure radiation emitted from the enclosed radiation source.

4. The device of claim 3, wherein the barrel collimator and the end cap are configured to block background radiation from outside the adapter from reaching the radiation detector.

5. The device of claim 3, wherein the barrel collimator comprises a plurality of set screws that pass through the tubular body and are configured to hold a radiation source within the adapter.

6. The device of claim 3, wherein the adapter further comprises a pedestal that is positionable within the barrel collimator and configured to hold a radiation source within the adapter.

7. The device of claim 2, wherein the adapter further comprises a pin-hole collimator couplable to the barrel collimator and comprising an pin-hole aperture for collimating radiation entering the barrel collimator from a radiation source.

8. The device of claim 7, wherein the adaptor further comprises means for closing the pin-hole aperture to block radiation from passing through the pin-hole aperture.

9. The device of claim 1, further comprising a radiation detector coupled to the adaptor.

10. The device of claim 9, wherein the radiation detector comprises a portable radiation detector.

11. The device of claim 9, wherein the radiation detector comprises a radioisotope identifier.

12. An adaptor kit for a portable radioisotope identifier, the kit comprising:
an annular barrel collimator configured to be coupled to a collimator of the hand-held radioisotope identifier;
a pin-hole collimator comprising a pin-hole collimation aperture and configured to be coupled to an open end of the barrel collimator; and
means for holding a radiation source inside of the barrel collimator.

13. The adaptor kit of claim 12, further comprising a pedestal configured to be positioned within the barrel collimator and configured to hold a radiation source within the barrel collimator.

14. The adaptor kit of claim 12, wherein the barrel collimator and the pin-hole collimator are comprised of tungsten.

15. The adaptor kit of claim 12, wherein the collimation aperture of the pin-hole collimator is closable to block external background radiation from entering the barrel collimator.

* * * * *